United States Patent
Ni

(10) Patent No.: US 10,813,350 B2
(45) Date of Patent: Oct. 27, 2020

(54) DEVICE AND METHOD FOR DETECTING BLOCKAGES IN AN AGRICULTURAL SPRAYER

(71) Applicant: CNH Industrial America LLC, New Holland, PA (US)

(72) Inventor: Bingcheng Ni, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/253,288

(22) Filed: Jan. 22, 2019

(65) Prior Publication Data
US 2019/0150423 A1 May 23, 2019

Related U.S. Application Data

(62) Division of application No. 14/300,376, filed on Jun. 10, 2014, now Pat. No. 10,219,506.

(51) Int. Cl.
*A01M 7/00* (2006.01)
*B05B 12/08* (2006.01)
(Continued)

(52) U.S. Cl.
CPC .......... *A01M 7/005* (2013.01); *A01M 7/0089* (2013.01); *A01M 7/0071* (2013.01);
(Continued)

(58) Field of Classification Search
CPC ...... A01M 7/00; A01M 7/0089; A01M 7/005; A01M 7/0071; B05B 15/50
(Continued)

(56) References Cited

U.S. PATENT DOCUMENTS 4,392,611 A * 7/1983 Bachman ............ A01M 7/0089
222/613
4,430,886 A * 2/1984 Rood ...................... B05B 15/50
73/37

(Continued)

FOREIGN PATENT DOCUMENTS

WO 89/03104 A1 4/1989

OTHER PUBLICATIONS

"Differential Pressure Flowmeters", Flow & Level Measurement, www.omega.com (23 pages).

*Primary Examiner* — Joseph A Greenlund
(74) *Attorney, Agent, or Firm* — Rebecca L. Henkel; Rickard K. DeMille

(57) ABSTRACT

An agricultural sprayer arrangement includes a chassis, at least one ground engaging traction member carried by the chassis, a liquid tank carried by the chassis, a boom carried by the chassis, a fluid conduit associated with the boom that is fluidly connected to the liquid tank, a spray nozzle that is fluidly connected to the fluid conduit and includes a nozzle body, a differential pressure sensor with a first pressure sensor in the fluid conduit associated with the spray nozzle and a second pressure sensor in the nozzle body, and an electrical processing circuit coupled to the differential pressure sensor. The differential pressure sensor is configured to output a pressure difference signal and the electrical processing circuit is configured to report a blocked nozzle when the pressure difference signal is less than a predetermined threshold value.

5 Claims, 4 Drawing Sheets

(51) Int. Cl.
  *B05B 15/50*  (2018.01)
  *B05B 12/00*  (2018.01)
(52) U.S. Cl.
  CPC .......... *B05B 12/006* (2013.01); *B05B 12/008* (2013.01); *B05B 12/085* (2013.01); *B05B 15/50* (2018.02)
(58) Field of Classification Search
  USPC ........ 239/1, 146, 159, 163–169, 71, 74, 722
  See application file for complete search history.

(56) References Cited

U.S. PATENT DOCUMENTS

| | | | | |
|---|---|---|---|---|
| 4,530,465 A * | 7/1985 | Gauchet | ............. | A01M 7/0089 239/127 |
| 4,556,815 A * | 12/1985 | Ohhashi | ............... | B05B 12/085 310/338 |
| 4,629,164 A * | 12/1986 | Sommerville | ...... | A01M 7/0092 239/69 |
| 4,668,948 A * | 5/1987 | Merkel | ................ | B05B 12/085 340/606 |
| 4,905,897 A * | 3/1990 | Rogers | ................ | A01M 7/0096 239/1 |
| 4,917,296 A * | 4/1990 | Konieczynski | ....... | B05B 12/006 239/1 |
| 5,097,633 A * | 3/1992 | Branton | ................ | B24C 7/0053 451/101 |
| 5,117,675 A * | 6/1992 | Notoyama | ............ | G01L 19/12 73/37 |
| 5,260,875 A * | 11/1993 | Tofte | .................... | A01B 79/005 111/903 |
| 5,316,217 A * | 5/1994 | Guzowski | ............... | B05B 15/50 239/71 |
| 5,392,645 A * | 2/1995 | Kleppe | ................... | G01F 1/662 700/282 |
| 5,481,260 A * | 1/1996 | Buckler | ............... | B05B 12/008 340/870.09 |
| 5,537,856 A * | 7/1996 | Kelbrick | ............. | G01P 13/0066 137/557 |
| 5,725,737 A * | 3/1998 | Pikulik | ................... | D21G 9/0036 162/263 |
| 5,755,884 A * | 5/1998 | Buckler | ............... | B05B 12/006 118/317 |
| 5,980,034 A * | 11/1999 | Tsai | ....................... | B41J 2/1707 347/89 |
| 6,302,130 B1 * | 10/2001 | Ohmi | .................... | G05D 7/0635 137/14 |
| 6,522,948 B1 * | 2/2003 | Benneweis | .......... | A01B 79/005 700/243 |
| 7,254,518 B2 * | 8/2007 | Eryurek | ................ | G01F 1/363 702/104 |
| 7,255,012 B2 * | 8/2007 | Hedtke | ...................... | F16K 3/03 73/861.61 |
| 7,311,004 B2 * | 12/2007 | Giles | ..................... | A01C 23/047 73/592 |
| 7,502,665 B2 * | 3/2009 | Giles | .................... | A01B 79/005 700/241 |
| 7,802,737 B2 * | 9/2010 | Rayner | ................. | E01C 19/004 239/172 |
| 8,100,022 B2 * | 1/2012 | Choisnet | ................. | G01P 5/165 73/861.65 |
| 8,191,795 B2 * | 6/2012 | Grimm | ............... | A01M 7/0089 239/1 |
| 8,191,798 B2 * | 6/2012 | Hahn | .................... | A01C 23/007 239/157 |
| 8,200,368 B2 * | 6/2012 | Nickerson | .............. | G05B 15/02 700/284 |
| 8,307,845 B2 * | 11/2012 | Kouchi | ................... | G01F 1/363 137/486 |
| 9,441,476 B2 * | 9/2016 | Gleitman | ................ | E21B 44/00 |
| 9,766,105 B2 * | 9/2017 | Ni | ....................... | A01M 7/0042 |
| 10,391,510 B2 * | 8/2019 | Posselius | ............ | B05B 12/1418 |
| 10,499,561 B2 * | 12/2019 | Grotelueschen | ..... | A01C 23/047 |
| 2006/0273189 A1 * | 12/2006 | Grimm | ................. | B05B 9/0423 239/146 |
| 2010/0292934 A1 * | 11/2010 | Stark | ....................... | G01F 9/001 702/24 |
| 2012/0211572 A1 * | 8/2012 | Peterson | ............... | A01M 7/006 239/1 |
| 2012/0228395 A1 * | 9/2012 | Needham | ............... | B05B 12/008 239/11 |
| 2012/0247234 A1 * | 10/2012 | Garrod | ................. | G01N 1/2035 73/864.81 |
| 2013/0008361 A1 * | 1/2013 | Trevino | ............... | A01C 23/007 111/120 |
| 2013/0008745 A1 * | 1/2013 | Barrett | .................... | F16N 29/04 184/6.11 |
| 2013/0153676 A1 * | 6/2013 | Ballu | .................. | A01C 23/007 239/11 |
| 2014/0277780 A1 * | 9/2014 | Jensen | ................. | B05B 12/085 700/283 |
| 2015/0351375 A1 * | 12/2015 | Ni | ........................ | A01M 7/005 239/1 |

* cited by examiner

DEVICE AND METHOD FOR DETECTING BLOCKAGES IN AN AGRICULTURAL SPRAYER

CROSS REFERENCE TO RELATED APPLICATIONS

The present invention is a divisional non-provisional utility patent application which is based on and takes priority from U.S. patent application Ser. No. 14/300,376, filed Jun. 10, 2014, entitled "DEVICE AND METHOD FOR DETECTING BLOCKAGES IN AN AGRICULTURAL SPRAYER," which is hereby incorporated by reference herein in its entirety.

BACKGROUND OF THE INVENTION

1. Field of the Invention

The present invention relates to agricultural sprayers, and, more particularly, to detecting blockages in agricultural sprayers.

2. Description of the Related Art

Agricultural sprayers apply a liquid to a crop or the ground at a specified application rate. The liquid may be in the form of a solution or mixture, with a carrier liquid (such as water) being mixed with one or more active ingredients (such as an herbicide, fertilizer, fungicide and/or a pesticide). The application rate can vary over different parts of a field through the use of precision farming techniques, such as by using GPS data to activate/deactivate boom sections of the sprayer as the sprayer traverses over the field.

Agricultural sprayers may be pulled as an implement or self-propelled, and typically include a tank, a pump, a boom assembly, and a plurality of nozzles carried by the boom assembly at spaced locations. The boom assembly typically includes a pair of wing booms, with each wing boom extending to either side of the sprayer when in an unfolded state. Each wing boom may include multiple boom sections, each with a number of spray nozzles (also sometimes referred to as spray tips). Of course, a self-propelled sprayer also includes an onboard power plant (e.g., diesel engine) providing motive force and other power such as hydraulic power, electrical power, etc.

The spray nozzles on the boom disperse one or more liquids from a tank carried by the sprayer onto a field. Each spray nozzle typically connects to a fluid conduit that is carried by the boom and receives a fluid flow from the tank, typically supplied to the fluid conduit by a pump. The nozzles have an inlet that connects to the fluid conduit and allows the fluid flow through the conduit to flow into the nozzle, which distributes the fluid to the field in a droplet or spray mist form.

During a spray operation, one or more of the nozzles can become clogged due to various reasons such as impurities in the carrier or active ingredient(s) accumulating in the nozzle. The nozzles are typically optimized to reduce application overlap during the spray operation, so even a single clogged nozzle can cause the active ingredient to be improperly applied to the field and leave strips unsprayed which may require a make-up run that generates no revenue but requires additional fuel and labor costs. A make-up run also causes additional ground compaction due to more passes and timing delays in killing the target pest or other operations dependent upon the spray application.

One known way to determine whether a blockage exists within a nozzle is to compare an electrical current drop across the nozzle to a preset value. If the electrical current drop deviates from the preset value by a certain amount, an alarm is issued. In agricultural sprayers that disperse various active ingredients, the electrical resistivity of the fluid can vary depending on what active ingredient is being dispersed within the carrier fluid. A system that measures current drop across the nozzle must take into account the various electrical resistivity values, or else false positives and negatives will occur in the detection system. Another system is known that detects pressure differences across a sprayer filter between the sprayer's liquid tank and nozzles. A first pressure is taken on the side of the filter closer to the liquid tank and a second pressure is taken on the side of the filter closer to the nozzles to determine a pressure difference. Both sides of the filter are in series with each other, so the filter essentially act as a mechanical resistor to fluid flow through the series. If the pressure difference across the filter meets certain predetermined criteria, an alarm can be issued. The issued alarm indicates a blockage in the filter, but gives no information on individual nozzle condition.

What is needed in the art is a way to detect nozzle blockages in an agricultural sprayer that is not affected by the dispersed fluid's electrical resistivity.

SUMMARY OF THE INVENTION

The present invention provides a device and method for detecting a blockage in a nozzle of an agricultural sprayer by comparing a pressure within the nozzle to a pressure within a fluid conduit that provides fluid flow to the nozzle.

The invention in one form is directed to an agricultural sprayer arrangement that includes a chassis, at least one ground engaging traction member carried by the chassis, a liquid tank carried by the chassis, a boom carried by the chassis, a fluid conduit associated with the boom and fluidly connected to the liquid tank, a nozzle that is fluidly connected to the fluid conduit and includes a nozzle body, a differential pressure sensor with a first pressure sensor in the fluid conduit associated with the nozzle and a second pressure sensor in the nozzle body, and an electrical processing circuit coupled to the differential pressure sensor. The differential pressure sensor is configured to output a pressure difference signal and the electrical processing circuit is configured to report a blocked nozzle when the pressure difference signal is less than a predetermined threshold value.

The invention in another form is directed to a method for detecting a blockage in an agricultural sprayer that includes the steps of providing a sprayer including a chassis, at least one ground engaging traction member carried by the chassis, a liquid tank carried by the chassis, a boom carried by the chassis, a fluid conduit associated with the boom that is fluidly connected to the liquid tank, a pump configured to produce a liquid flow through at least a portion of the fluid conduit from the liquid tank, and a nozzle that is connected to the liquid flow and includes a nozzle body. A first pressure in the liquid flow is determined and a second pressure in the nozzle body is determined. A pressure difference is determined between the first pressure and the second pressure. A blockage is reported when the pressure difference is less than a predetermined threshold value.

An advantage of the present invention is that a blockage can be detected in a sprayer nozzle without needing to take the flowing fluid's electrical resistivity into account.

Another advantage is that the present invention can be utilized in applications that utilize high pressure flow rates.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
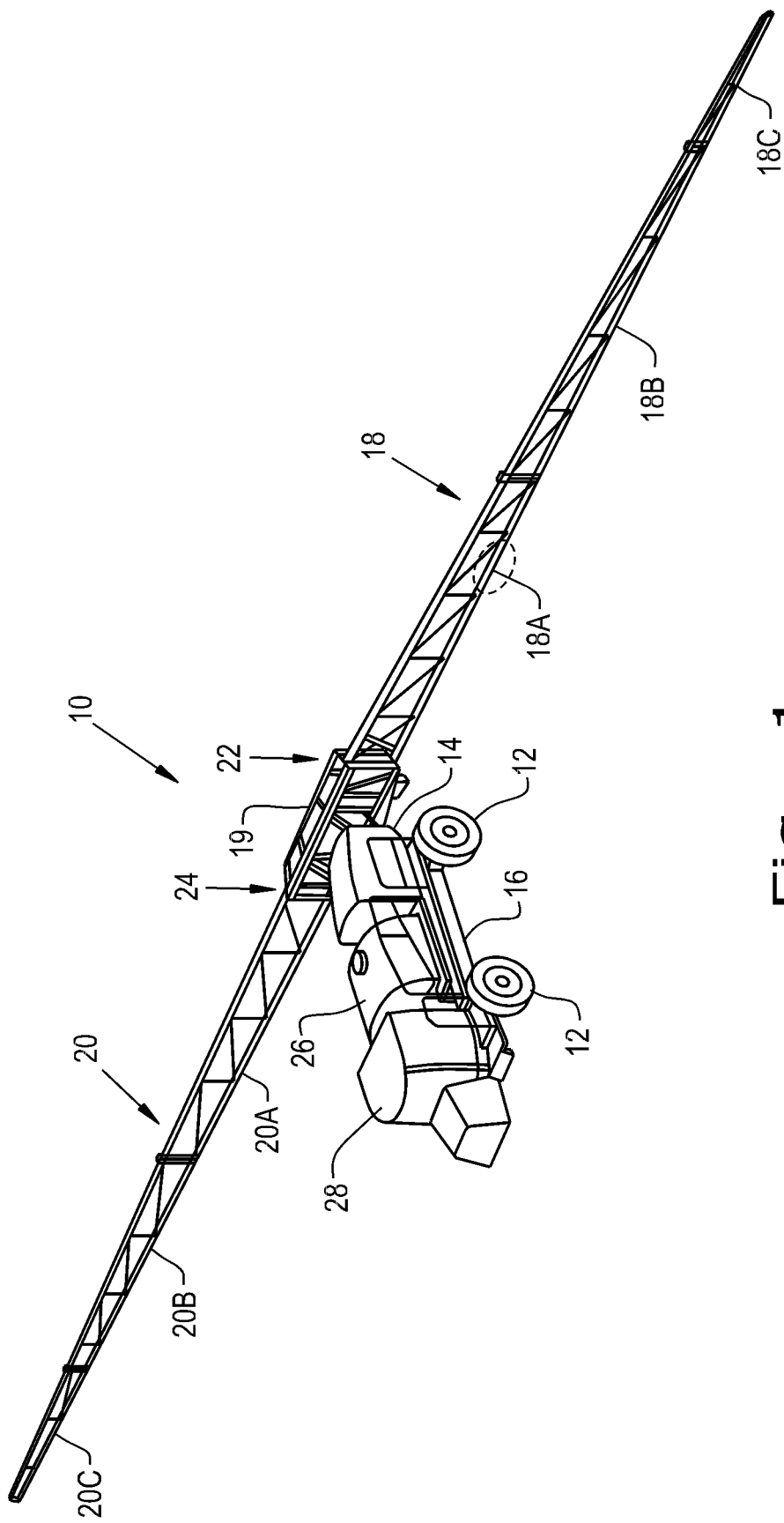
FIG. 1 is a perspective view of an agricultural sprayer arrangement according to the present invention.

Referring now to the drawings, and more particularly to FIG. 1, there is shown an agricultural sprayer 10 according to one embodiment of the present invention. Agricultural sprayer 10 is shown as a self-propelled sprayer with a plurality of wheels 12 and a prime mover in the form of an internal combustion (IC) engine (e.g., diesel engine) within an engine compartment 14. However, agricultural sprayer 10 could also be configured as a towed sprayer which is towed behind a work vehicle such as a tractor. Moreover, agricultural sprayer could also be a track-type self-propelled vehicle for certain applications.

Agricultural sprayer 10 includes a chassis 16 to which a pair of wing booms 18, 20 are connected, united by a center boom 19. For sake of description, wing boom 18 is considered a left wing boom and wing boom 20 is considered a right wing boom. The wing booms 18, 20 are connected to center boom 19, joined about respective pivot connections 22, 24. Center boom 19 is connected at or near the rear of chassis 16. The wing booms 18, 20 are designed to fold forward toward the leading end of chassis 16 when wing booms 18, 20 are moved from an extended position, shown in FIG. 1, to a stowed or transport position (not shown).

Each wing boom 18, 20 supports a number of boom sections 18A, 18B, 18C, 20A, 20B and 20C. Center boom 19 and wing boom sections 18A, 18B, 18C, 20A, 20B and 20C each include a number of spray nozzles (shown in FIG. 2). In the embodiment shown, each wing boom has three boom sections, corresponding to the fold locations of the wing boom. In the illustrated embodiment, the spray nozzles of center boom 19 and wing boom sections 18A, 18B, 18C, 20A, 20B and 20C are fluidly connected in parallel relative to each other. Moreover, the spray nozzles within center boom 19 and a same wing boom section 18A, 18B, 18C, 20A, 20B or 20C are typically connected together in series. This arrangement of spray nozzles allows the spray nozzles of center boom 19 and wing boom sections 18A, 18B, 18C, 20A, 20B and 20C to be independently turned on and off as sprayer 10 advances across a field (e.g., manually or using GPS data). A liquid tank 26 is carried by the chassis 16 and supplies carrier fluid mixed with active ingredient(s) to the spray nozzles for dispersion on a field. Although the liquid tank 26 is shown as a single tank, the present invention contemplates multiple liquid tanks supplying a solution of carrier fluid mixed with active ingredient(s) to the spray nozzles.

Figure 2:
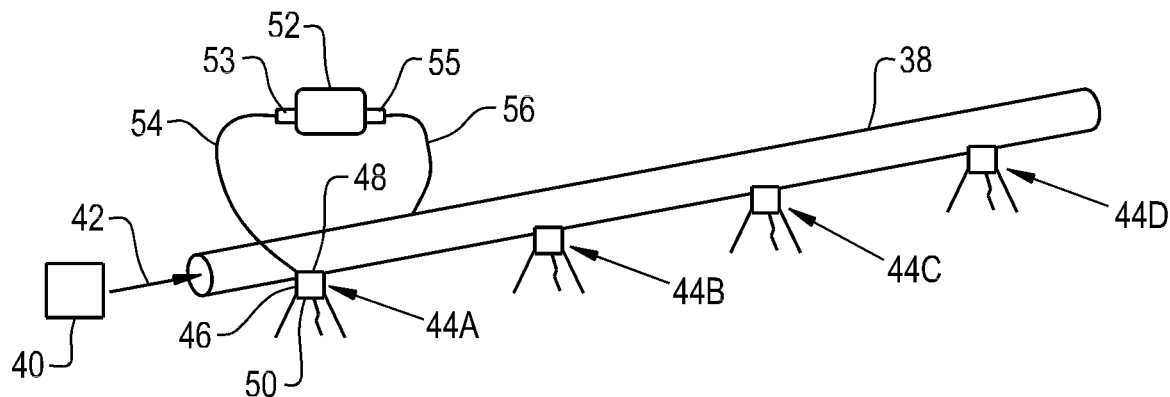
FIG. 2 is a sectional view of the agricultural sprayer arrangement shown in FIG. 1.

Referring now to FIG. 2, a sectional view of a portion of wing boom section 18A is shown. Although a section of wing boom section 18A is shown, the present invention contemplates that any of the other wing boom sections 18B, 18C, 20A, 20B and 20C can be structured in a similar manner. As can be seen, a fluid conduit 38 is associated with wing boom section 18A and is supplied with fluid from liquid tank 26 by a pump 40 that is connected to the liquid tank 26 and the fluid conduit 38. In the illustrated embodiment, fluid conduit 38 is assumed to be a reinforced hose which is carried by wing boom section 18A. The pump 40 creates a fluid flow through the fluid conduit 38 with a flow rate F, depicted by arrow 42. Spray nozzles 44A, 44B, 44C, and 44D are attached to the wing boom section 18A and each have an inlet that is fluidly connected to the fluid conduit 38 so that liquid flowing through the fluid conduit 38 can be dispersed through the spray nozzles 44A, 44B, 44C, and 44D. The rest of the description will focus on spray nozzle 44A, but it should be understood that the teachings of the present invention can be applied to any spray nozzle that is included in an agricultural sprayer. Spray nozzle 44A has a nozzle body 46 and is fluidly connected to the fluid conduit 38 through an inlet 48 formed in the nozzle body 46. Fluid will flow from the fluid conduit 38 through the inlet 48 and nozzle body 46 to a dispersal end 50 of the spray nozzle 44A, which can be structured to turn the fluid flow into droplets or a spray mist for dispersion on a field or crops.

A differential pressure sensor 52 is included in the sprayer arrangement according to the present invention. The differential pressure sensor 52 has a first tube 54 that is placed within the nozzle body 46 of spray nozzle 44A and a second tube 56 placed in the fluid flow within the fluid conduit 38. First tube 54 is part of a first pressure sensor 53 and second tube 56 is part of a second pressure sensor 55. The first pressure sensor 53 and second pressure sensor 55 are both part of the differential pressure sensor 52. Although only one differential pressure sensor 52 is shown with tube 54 placed in the nozzle body 46 and tube 56 placed in the fluid flow within the fluid conduit 38, each spray nozzle 44A, 44B, 44C and 44D could have an associated differential pressure sensor with one tube in the spray nozzle's body and the other tube in the fluid flow within the fluid conduit 38 near the spray nozzle. It is useful for tubes 54 and 56 to be flexible, but they can also be rigid if desired. Tube 54 provides fluid from the nozzle body 46 to the first pressure sensor 53 with first local pressure P1 and tube 56 provides fluid from the fluid conduit 38 to the second pressure sensor 55 with second local pressure P2. The differential pressure sensor 52 compares the first local pressure P1 to the second local pressure P2 to determine a pressure difference PD, which can be output as a pressure difference signal by the differential pressure sensor 52.

Figure 3:
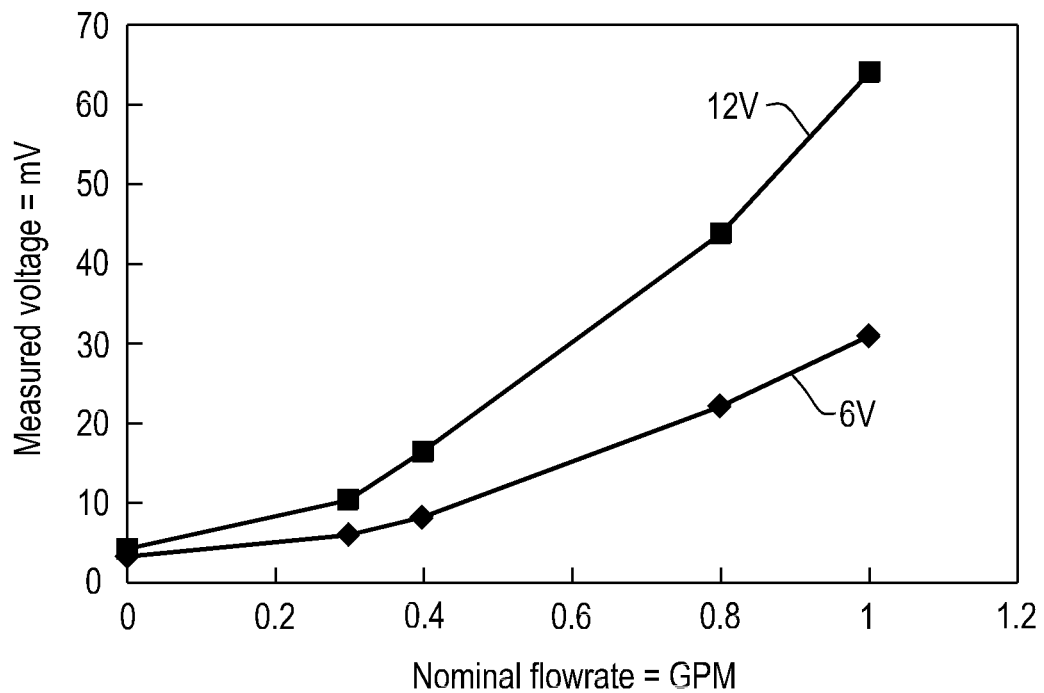
FIG. 3 is a graph illustrating the relationship between nominal flow rate and measured voltage output by a differential pressure sensor of the present invention.

The fluid conduit 38 has a diameter that is significantly larger than the diameter of the inlet 46. In this regard, fluid that flows into the spray nozzle 44A through the inlet 46 will be similar to fluid flowing through a constricted section of a pipe. The different values between the first local pressure P1 and the second local pressure P2 when the spray nozzle 44A is in an unclogged state is therefore directly proportional to the flow rate of the fluid in the fluid conduit 38. As shown in FIG. 3, the differential pressure sensor 52 outputs a higher voltage when more fluid leaves the spray nozzle 44A through the dispersal end 50, indicating that the first local pressure P1 is lower relative to the second local pressure P2 when the flow rate through the spray nozzle 44A increases. When the spray nozzle 44A is partially clogged, the first local pressure P1 in the nozzle body 46 will increase due to a lowered flow rate through the dispersal end 50. An increased first local pressure P1 will lead to a reduced pressure difference PD, as the second local pressure P2 in the fluid conduit 38 is relatively unaffected by changes in the flow rate through the dispersal end 50. A reduced pressure difference PD will lead to a pressure difference signal with a lower measured voltage and could be indicative of a clog in the spray nozzle 44A. As can be seen, the relationship between the measured voltage and the nominal flow rate displays similar behavior whether a 6V or 12V excitation voltage is supplied to the differential pressure sensor 52, with the measured voltage approximately doubling when a 12V excitation voltage is used rather than a 6V excitation voltage.

Figure 4:
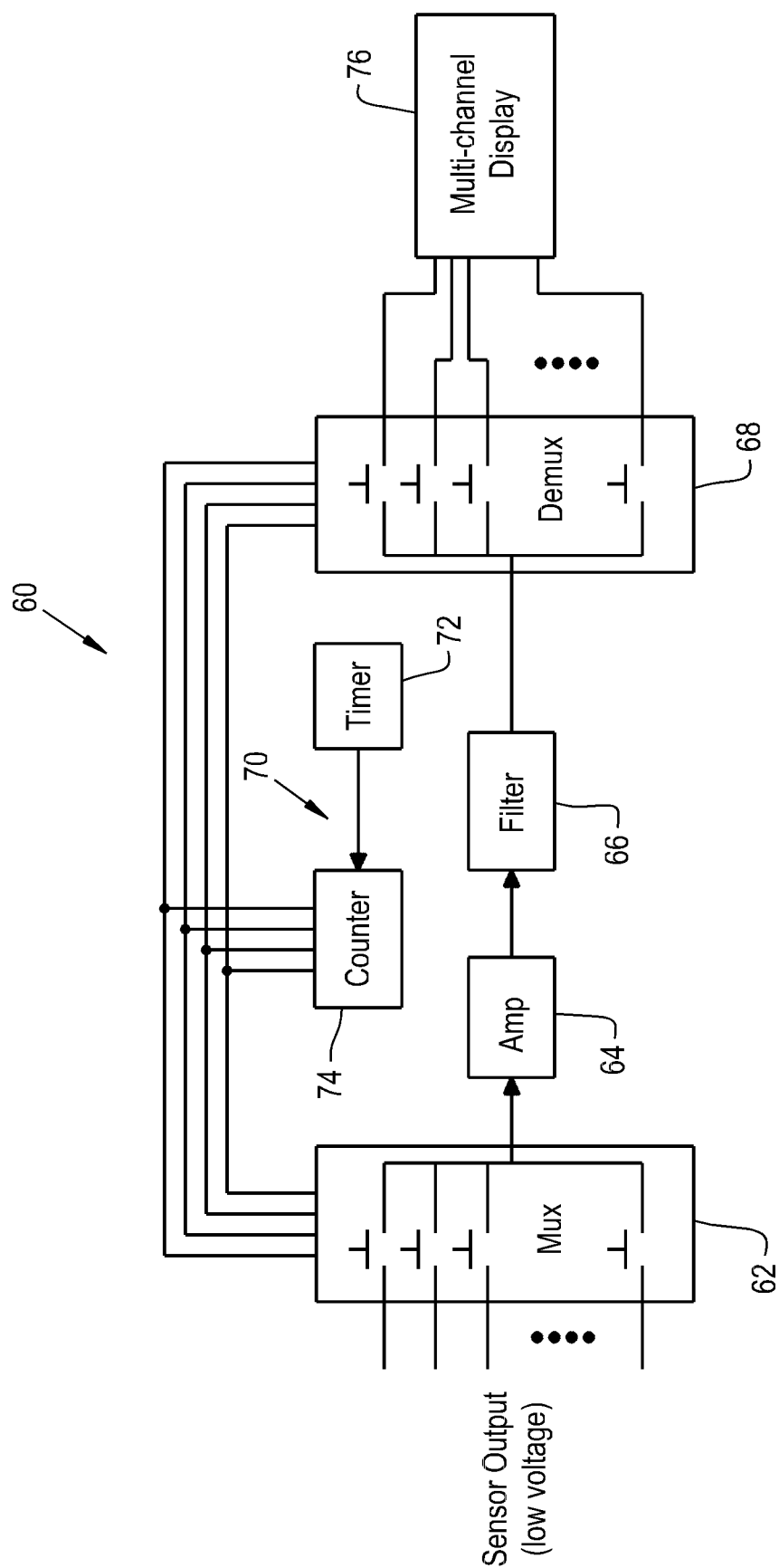
FIG. 4 is a schematic diagram of an electrical processing circuit included in the agricultural sprayer arrangement shown in FIG. 1.

Referring now to FIG. 4, an electrical processing circuit (EPC) 60 is shown that can receive the pressure difference signal from the differential pressure sensor(s) 52 to determine whether a blockage exists in the spray nozzle(s) 44A, 44B, 44C, and/or 44D. The EPC 60 can be configured as a digital controller, or alternatively configured as an analog processor. The EPC 60 can include a multiplexer 62 that is coupled to one or more differential pressure sensor(s) 52 so that the pressure difference signal(s) can be commonly sent across one path. An amplifier 64 can be coupled to the multiplexer 62 and increases the voltage of the pressure difference signal. The gain that the amplifier 64 adds can be adjusted depending on the anticipated pressure difference signal(s) that will be produced by the differential pressure sensor(s) 52. A filter 66 can be coupled to the amplifier 64 to reduce noise in the amplified pressure difference signal. If a multiplexer 62 is utilized to send pressure difference signals from multiple differential pressure sensors through the amplifier 64 and filter 66, a de-multiplexer 68 is coupled to the filter 66 so that the various pressure difference signals can be sorted out and attributed to the proper differential pressure sensor. In such a configuration, a timing circuit 70 is included that generates a clock signal to control the multiplexer 62 and de-multiplexer 68. The timing circuit 70 includes a timer 72 coupled to a counter 74 which is coupled to the multiplexer 62 and de-multiplexer 68. A multi-channel display 76 is coupled to the de-multiplexer 68 and configured to report an alarm if one or more spray nozzles is clogged, based on the amplified pressure difference signal. One multi-channel display 76 that could be used is commercially sold as the AFS Pro 700 by Case IH Corporation. It is contemplated that the multi-channel display 76 can also be interactive so that a user could, for example, reset an issued alarm through the multi-channel display 76 if a false positive clogged condition is reported. While a multi-channel display 76 is shown, the present invention could be modified to detect blockages in a single spray nozzle, which would only require a display with a single channel to report a blockage in the spray nozzle.

The multi-channel display 76 can alert a user to a potentially clogged spray nozzle in a variety of ways. For example, the multi-channel display 76 could have an LED (not shown) connected to each pathway of the de-multiplexer 68. If the pressure difference signal through one of the pathways does not have a high enough voltage, signifying a low pressure difference PD and possible blockage in a spray nozzle, the associated LED could turn off. A turned off LED could be visually seen by an operator and alert the operator that a particular spray nozzle might be clogged. The voltage required to keep an LED actively lit could therefore act as a predetermined threshold to indicate whether a spray nozzle is clogged or not. Other predetermined thresholds could also be chosen, such as a setting in the multi-channel display 76 to issue an alarm if the pressure difference signal is below a certain voltage. It is also contemplated that the predetermined threshold could be a certain signal frequency, with a pressure difference signal above or below the predetermined frequency indicating a blockage in the spray nozzle. More elaborate methods of alerting an operator to a clogged spray nozzle, such as an alarm sound or visual warning, are also contemplated as being used. The multi-channel display 76 can include a processing unit and a memory that stores the predetermined threshold value(s), with the processing unit analyzing whether the received amplified pressure difference signal(s) meets the predetermined threshold conditions and then determining whether to issue an alarm. In such a configuration, the predetermined threshold values can be either set into the memory or adjustable by an operator.

Figure 5:
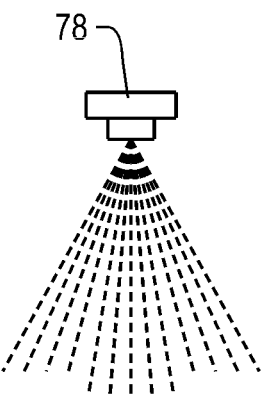
FIG. 5 is a perspective view of an unclogged sprayer nozzle in operation.
Figure 6:
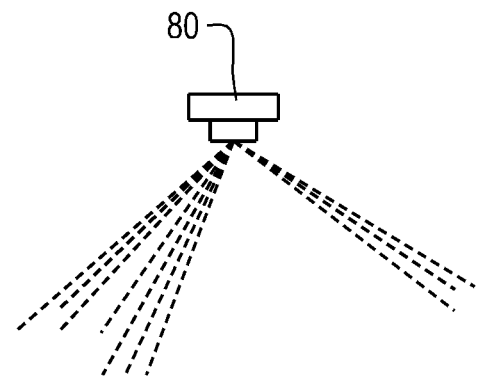
FIG. 6 is a perspective view of a partially clogged sprayer nozzle in operation.
Figure 7:
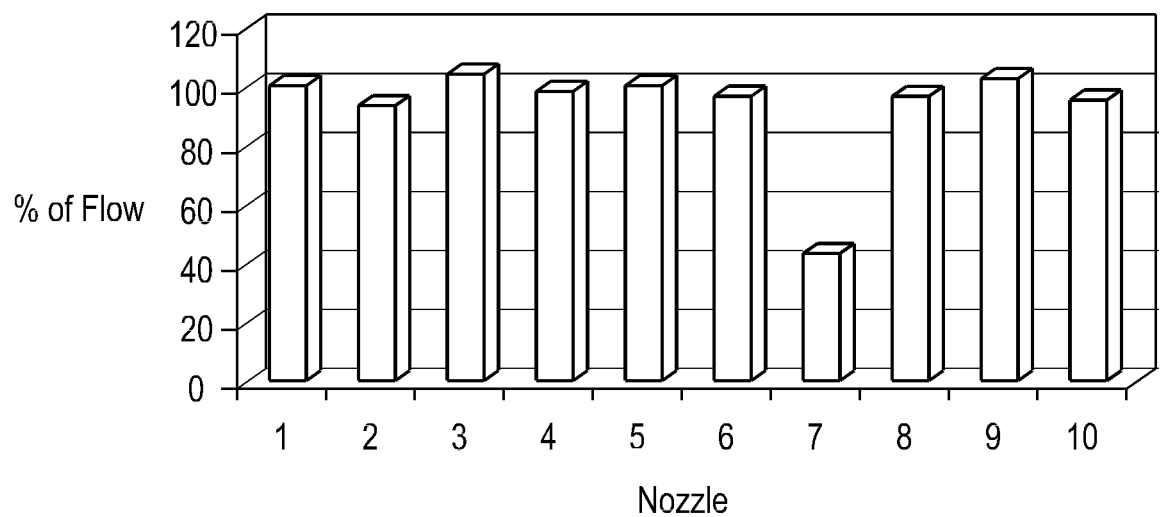
FIG. 7 is a bar graph illustrating flow rate percentage deviations in an agricultural sprayer for unclogged and partially clogged sprayer nozzles.

Referring now to FIGS. 5 and 6, an unclogged spray nozzle 78 is shown in FIG. 5 and a partially clogged spray nozzle 80 is shown in FIG. 6. As can be seen, the spray pattern and dispersal volume between the unclogged spray nozzle 78 and the partially clogged spray nozzle 80 is significantly different. The spray pattern and dispersal volume of partially clogged spray nozzle 80 will result in an improperly treated area on the field, which could require a make-up run. However, it's normal for the flow volume between identically structured nozzles to deviate from each other, as shown in FIG. 7. The flow rate through the unclogged nozzles 1, 2, 3, 4, 5, 6, 8, 9 and 10 are shown as varying between approximately 90% and a little over 100% of maximum flow. The unclogged nozzles 1-6, 8, 9 and 10 have a relatively tight distribution of flow rate percentages. Nozzle 7 is shown with a significantly lowered flow rate of just over 40%, which is indicative that the nozzle 7 has been clogged. It is therefore contemplated that the predetermined threshold value chosen before an alarm is issued can take into account normal flow rate deviations that are not indicative of a clogged spray nozzle. The predetermined threshold value can be chosen to issue an alarm when it correlates to a flow rate of 80% or lower of maximum flow, which could be indicative of a spray nozzle clogging. It is also contemplated that the predetermined threshold value can correlate to a flow rate percentage that deviates from the median or average flow rate of all spray nozzles by a certain number of standard deviations calculated by the EPC 60. It is also contemplated that multiple alarms can be issued, such as a warning alarm that alerts a user to a pressure difference signal which correlates to a flow rate percentage of below 90% but above 80% and a clogged alarm that alerts a user to a pressure difference signal which correlates to a flow rate percentage of below 80%. The predetermined threshold values before issuing an alarm are given only by way of example and not to limit the scope of the invention in any manner.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for detecting a blockage in an agricultural sprayer, comprising the steps of:
    providing a sprayer including a chassis, at least one ground engaging traction member including a wheel carried by said chassis, a liquid tank carried by said chassis, a boom carried by said chassis, a fluid conduit associated with said boom and fluidly connected to said liquid tank, a pump configured to produce a liquid flow through at least a portion of said fluid conduit from said liquid tank, and a spray nozzle fluidly connected to said liquid flow and including a nozzle body;
    determining a first pressure in said liquid flow;
    determining a second pressure in said nozzle body;
    determining a pressure difference between said first pressure and said second pressure, wherein said determining steps are performed by a differential pressure sensor having a first pressure sensor in said liquid flow outside said nozzle body and a second pressure sensor in said nozzle body;
    providing an electrical processing circuit coupled wife said differential pressure sensor, said electrical processing circuit performing a reporting step and a displaying step;
    providing a control circuit coupled having a multi-channel display, wherein said control circuit includes a multi picker coupled to said differential pressure sensor, an amplifier coupled to said multiplexer, a filter coupled to at least one of said multiplexer and said amplifier, and a de-multiplexer coupled to at least one of said filter, said amplifier and said multi-channel display;
    reporting a blockage when said pressure difference is less than a predetermined threshold value.

2. The method according to claim 1, further including the step of creating an alarm when said blockage is reported.

3. The method according to claim 1, wherein said electrical processing circuit includes a timing circuit that generates a clock signal for said multiplexer and said de-multiplexer.

4. The method according to claim 1, wherein said pressure difference corresponds to a nozzle flow rate of liquid out of said spray nozzle.

5. The method according to claim 4, wherein said predetermined threshold level is when said pressures difference corresponds to a nozzle flow rate of liquid of less than 80 percent of an unclogged flow rate.

* * * * *